United States Patent [19]

Dempsey et al.

[11] Patent Number: 4,622,729
[45] Date of Patent: Nov. 18, 1986

[54] APPARATUS FOR REMOVING BURRS FROM WELDED MATERIAL

[75] Inventors: William J. Dempsey, Lombard; Walter R. Brunken, Medinah; Alfred F. Mailhiot, Jr., Country Club Hills, all of Ill.

[73] Assignee: Addison Machine Engineering Inc., Chicago, Ill.

[21] Appl. No.: 599,240

[22] Filed: Apr. 11, 1984

[51] Int. Cl.⁴ .................. B23P 15/44; B23P 23/04
[52] U.S. Cl. .......................... 29/33 A; 29/33 T; 409/140
[58] Field of Search ............ 29/33 T, 81 G, 81 F, 29/33 A; 409/292, 298, 300, 310, 316, 336, 346, 140

[56] References Cited

U.S. PATENT DOCUMENTS

| | | | |
|---|---|---|---|
| 152,585 | 6/1874 | Wells | 409/298 |
| 1,608,426 | 11/1926 | Rausch | 409/336 X |
| 2,730,022 | 1/1956 | Waldrich | 409/346 |
| 2,893,292 | 7/1959 | Naperola | 409/140 |

*Primary Examiner*—Eugene F. Desmond
*Attorney, Agent, or Firm*—Richard J. Myers & Assoc.

[57] ABSTRACT

A scarfing apparatus for removing a weld bead from a tube being produced by a continuous method, wherein the tube enters one end of a hollow spindle which rotatably supports a scarfing tool holder on which is mounted a tool bit. The tool bit has an arcuate shape having a segment which extends 180° or less about the periphery of the tube. The other end of the spindle is provided with a sensing device which, in conjunction with a power unit and control means, applies oscillatory rotational movement to the spindle to thereby cause the tool bit to rock back and forth across the surface of the moving tube to remove the weld bead. The tool holder is provided with an undercut section adapted to receive securing means for mounting the tool bit in a manner to facilitate rapid removal thereof for installing a new tool bit without ceasing the operation of the continuous tube-forming apparatus.

23 Claims, 4 Drawing Figures

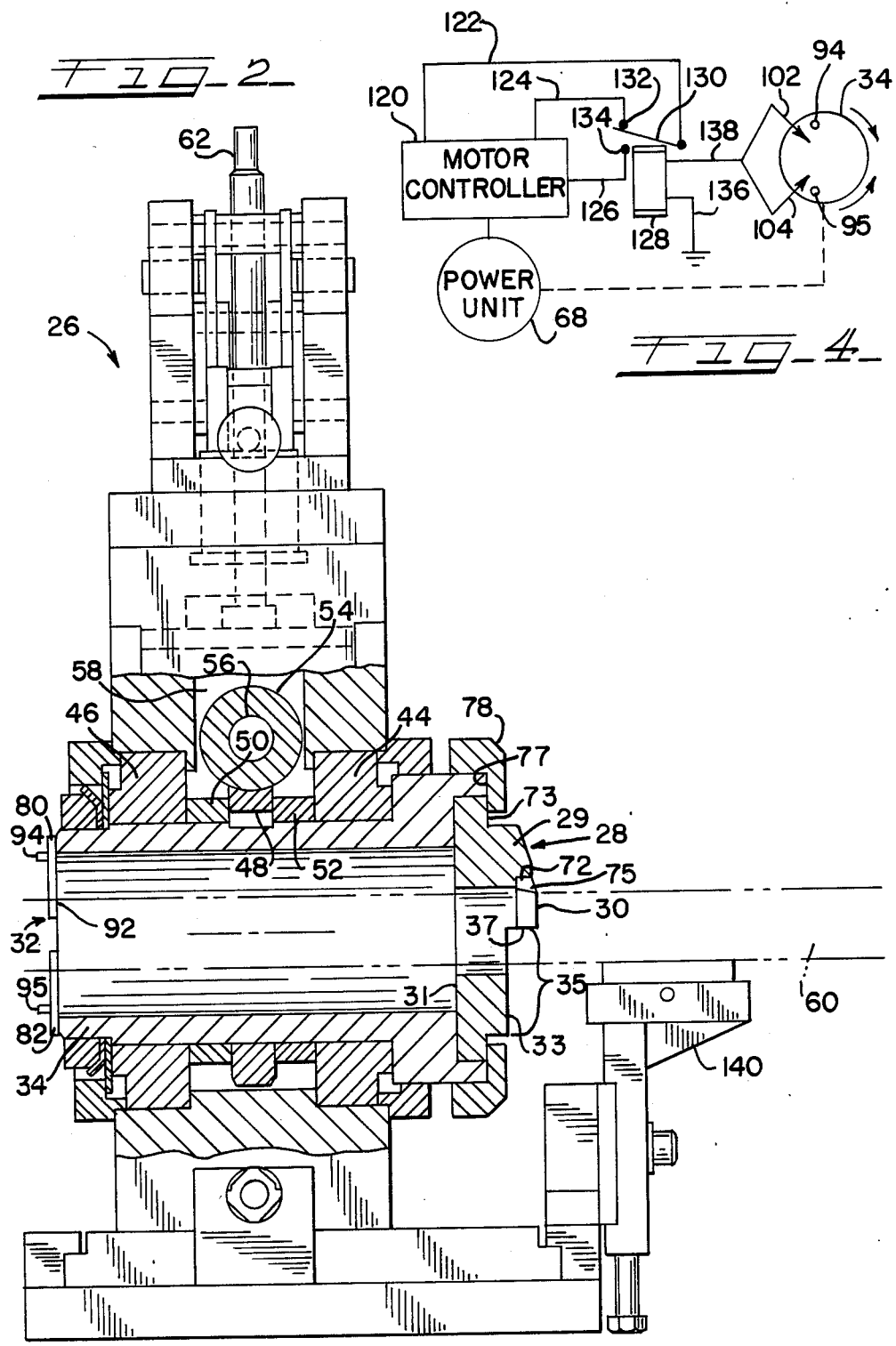

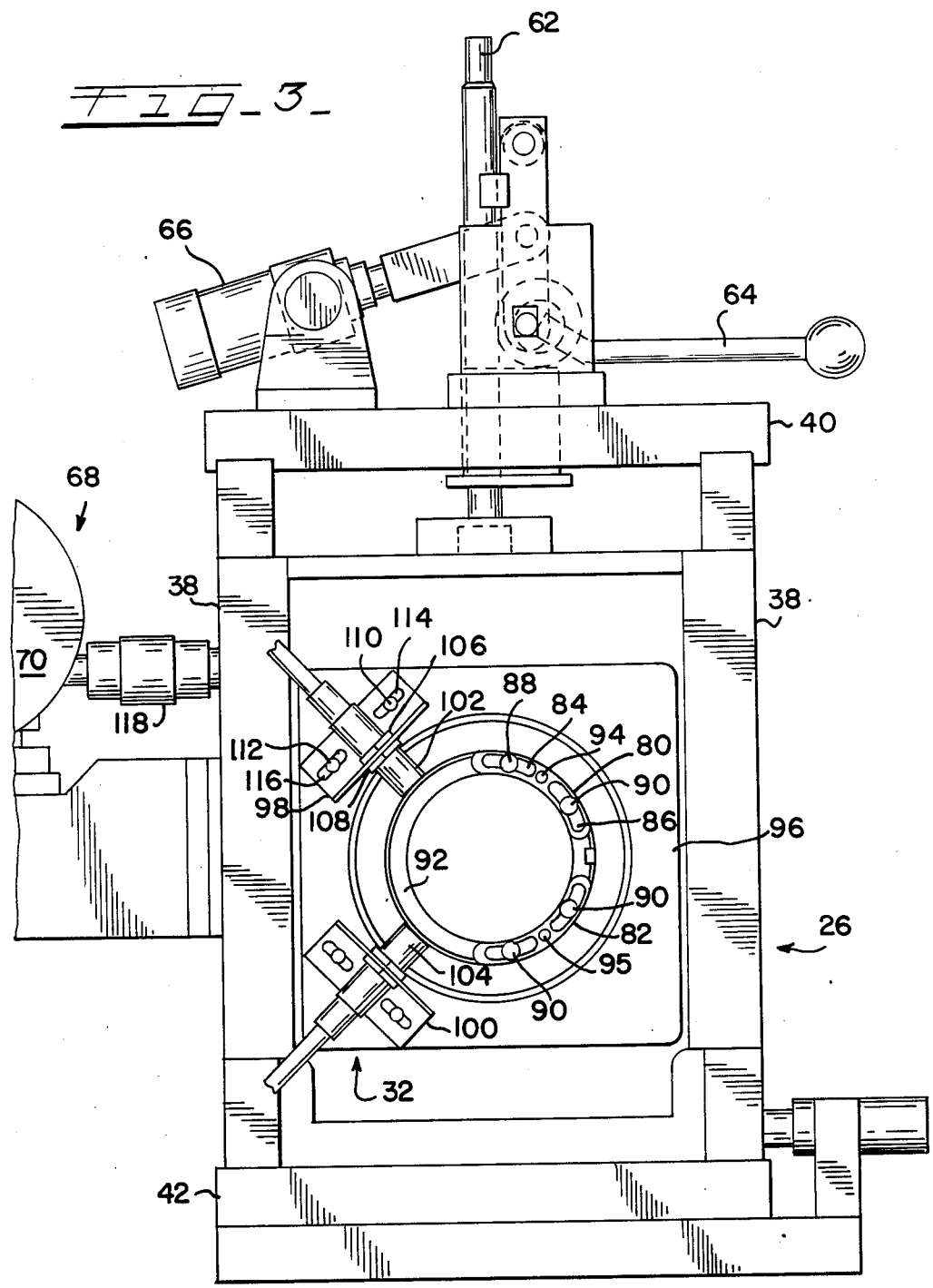

APPARATUS FOR REMOVING BURRS FROM WELDED MATERIAL

BACKGROUND OF THE INVENTION

1. Field of the Invention

This invention is generally directed to the removal of a weld bead from the outside surface of a tube by means of scarfing and, more specifically, to an apparatus for removing a weld bead from a tube being produced by a continuous method.

2. Description of the Prior Art

Various methods and apparatus are known for removing weld beads from tubes. For example, U.S. Pat. No. 1,973,877 describes an apparatus using a pair of rotary shears which cooperatively removes the weld bead from a tube as the tube passes in a scarfing contact with the shears. One disadvantage of this apparatus is in the use of two shears which wear out unevenly and have to be replaced quite often.

Another form of removing a weld bead is described in U.S. Pat. No. 3,755,884 which uses a stationary scarfing tool which is positioned in a scarfing contact with a moving tube as it is being formed on a tube-forming machine. Since the scarfing tool removes the weld bead by a brute force, the formed tube is subject to deformation. Furthermore, the scarfing tool wears out fairly rapidly and requires frequent replacement.

A better apparatus for removing weld beads is described in U.S. Pat. No. 1,954,511, wherein in the embodiment shown in FIGS. 5 and 6, a ring-shaped cutter, rotatably mounted, removes the weld bead from a tube as it passes through the center of the cutter. The main objection to this type of cutter is that, should the cutter perform improperly and have to be removed, it is necessary to shut down the tube-forming apparatus so that the ring cutter can be replaced.

SUMMARY OF THE INVENTION

Since it has been found that a malfunction in a ring-shaped cutter requires the shut down of the tube-forming apparatus in accordance with the present invention, there is provided a scarfing apparatus employing a rotatably supported scarfing cutter which can be readily replaced without stopping the operation of the apparatus continuously forming a tube.

It is the principal object of this invention to provide an apparatus for scarfing the weld bead from the outside surface of a welded tube without deforming the tube under the action of the scarfing tool.

It is another object of this invention to provide an apparatus for scarfing the weld bead from a welded tube without requiring cooling of the scarfing tool.

A still further object of the invention is to provide means for oscillatingly supporting a scarfing tool to provide uniform scarfing contact with the tube.

Another object of the invention is to provide means on the scarfing apparatus to support the scarfing tool in a quick-release manner.

A still further object of the invention is to provide an oscillatingly-supported scarfing unit which not only removes the weld bead, but provides polishing to the surface of the tube.

Other objects and advantages will become apparent from the following description and drawings.

BRIEF DESCRIPTION OF THE DRAWINGS

FIG. 2 is a sectional view of the scarfing apparatus;

FIG. 3 is the opposite end view of the scarfing apparatus; and

FIG. 4 is a circuit schematic adapted for providing oscillating motion to the scarfing tool.

DESCRIPTION OF THE PREFERRED EMBODIMENT

Figure 1:
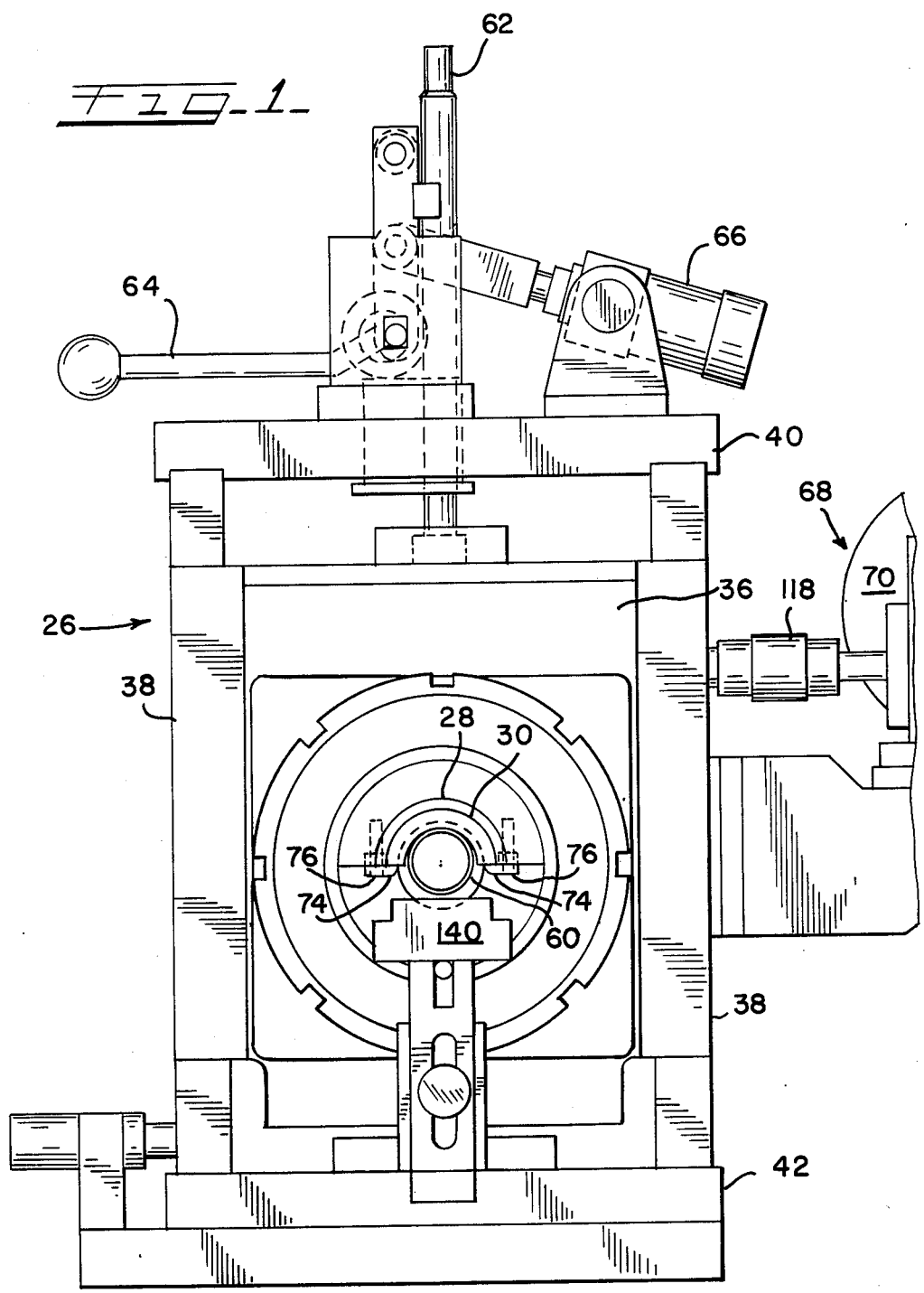
FIG. 1 is an end view of a scarfing apparatus provided with an oscillatingly-supported scarfing tool.

Referring to FIGS. 1 through 3, the preferred embodiment of the invention is concerned with a scarfing apparatus 26 which has been modified to use an improved scarfing tool holder 28 supporting an arcuate tool bit 30 which is adapted to remove a weld bead from a continuously formed tube 60 shown in phantom in FIG. 2 entering into the scarfing apparatus 26 and exiting the apparatus adjacent a sensing device 32 which is responsible for controlling the rotary movement of a spindle 34. The mechanical features of the scarfing apparatus 26 will not be discussed in detail inasmuch as the scarfing apparatus is well known, for example, as manufactured by Addison Machine Engineering, Inc. of Addison, Ill.

The scarfing apparatus 26 comprises a bearing block 36 movably supported in a vertical direction between frame members 38 spaced between a top plate 40 and a bottom plate 42. The bearing block 36 furnishes support for the spindle 34 as shown in FIG. 2, rotatably supported by bearings 44 and 46. The central portion of the spindle 34 on the periphery thereof is provided with a driven worm gear 48 which is spaced from the bearings 44 and 46 by spacers 50 and 52, respectively.

The driven worm gear 48 is actuated by a driving worm gear 54 supported on a shaft 56, the ends of which are supported by blocks, such as block 58.

As shown in FIG. 1, the bearing block 36 supporting the spindle and the associated scarfing tool holder 28 and the arcuate tool bit 30 can be positioned with respect to the tube 60 by means of a threaded member 62 so that a proper scarfing action may be maintained on the tube 60 as it moves through the apparatus 26.

If it is necessary to remove the scarfing tool holder 28 and its associated tool bit 30 away from the tube 60, this can be done by a quick release handle 64, or it can be automatically provided for by an air cylinder 66.

The driving worm gear 54 is actuated by a power unit 68 comprising a D.C. motor and speed reducer 70, as viewed in FIG. 3.

As best viewed in FIG. 1, the scarfing tool holder 28 has substantially a semi-circular shape having a substantially circular-shaped seat 72 (FIG. 2) adapted to receive a substantially semi-circular-shaped tool bit 30 which is secured to the tool holder 28 by a pair of brackets 74 and bolts 76, the bracket-bearing tool bit having supporting lips 75. As best viewed in FIG. 2, the scarfing tool holder 28 is, in turn, supported on the spindle 34 by a tool holder locking nut 78. The tool holder 28 is made from a plate 29 having a distal side 31 secured to an end of the spindle 34 and a frontal side 33 having an undercut portion 35, the remaining portion of said tool holder defining an overhang 37. The frontal side 33 has a peripheral shoulder 73 which is abutted by an interior shoulder 77 of the locking nut 78.

The other end of the spindle 34, as shown in FIGS. 2 and 3, supports a pair of actuator brackets 80 and 82.

Each actuator bracket, such as actuator bracket 80, has an arcuate shape provided with a pair of arcuate slots 84 and 86 which receive a pair of securing members 88 and 90, respectively, which members secure the actuator bracket 80 to an end 92 of the spindle 34. The arcuate slots 84 and 86 allow the actuator bracket to be adjustably positioned on the spindle end 92. Each actuator bracket, such as actuator bracket 80, is provided with an actuator pin 94 which extends outwardly of the actuator bracket 80, as shown in FIG. 2. The actuator bracket 82 supports a position indicator member, such as an actuator pin 95. These pins establish the range of the oscillatory rotational movement of the spindle, as will be discussed later.

Mounted on a plate 96, as shown in FIG. 3, is a pair of sensor brackets 98 and 100 supporting a pair of the sensors 102 and 104, respectively. The position of the sensors, such as sensor 102, can be adjusted radially with respect to the spindle 34 by adjustable members 106 and 108. The tangential position of each sensor, such as sensor 102, can be obtained by loosening securing members 110 and 112 so that a sliding movement of the sensor bracket 98 can be obtained through its slots 114 and 116. The sensors 102 and 104 are actually commonly known proximity switches, such as type TL-X 5 Y1 manufactured by Omron Company. The sensors 102 and 104 and the actuator brackets 80 and 82 and the associated actuator pins 94 and 95 comprise the sensing device 32. The brackets and the supported sensors are mounted at 90° to each other.

When the power unit 68 is energized, rotary power at a reduced speed is applied by a coupling 118 to the shaft 56 supporting the driving worm gear 54 which, in turn, transmits rotary power to the driven worm gear 48 mounted on the spindle 34 to thereby provide rotational movement to the spindle. The motion transmitted to the spindle 34 is of an oscillating nature, that is, the spindle will rock back and forth, as will now be discussed more fully.

Referring to FIG. 4, there is shown a basic control circuit for controlling the power unit 68 in such manner as to apply partial rotational movement in an oscillating manner to the spindle 34 which, as has been discussed previously, supports the actuator pins 94 and 95 which, as the spindle is rotatably moved, interact with the sensors 102 and 104, respectively.

As shown in FIG. 4, the power unit 68 is controlled by a motor controller 120 which is coupled by leads 122, 124, and 126 to a latching relay 128. The relay 128 has a movable contact 130 adapted to make contact with a stationary contact 132 terminating the lead 124 and to make contact with a stationary contact 134 terminating the lead 126. The internal coil of the relay 128 has one of its leads 136 connected to ground and the other lead 138 connected to the sensors 102 and 104.

When the motor controller 120 is energized, power is applied by the power unit to the spindle 34 to rotate it in a counterclockwise direction because of the contact established between the movable contact 130 and the lead 124. As the spindle 34 rotates in the counterclockwise direction, the actuator pin 94 will reach a position adjacent the sensor 102 which, at this time, will send a pulse to the relay 128 to unlatch the relay and cause the movable contact 130 to establish contact with the stationary contact 134, thereby latching the relay in a new position. When this happens, a signal is applied over the lead 126 to the motor controller 120 to change the direction of D.C. current applied to the power unit 68, thereby causing the power unit to reverse its rotational direction and apply a clockwise rotational movement to the spindle 34. As the spindle 34 moves in the clockwise direction, the actuator pin 95 will reach a position opposite the sensor 104 to trigger a pulse to unlatch the relay 128, causing thereby the movable contact 130 to establish contact with the lead 124, to thereby cause the motor controller 120 to reverse the D.C. current applied to the power unit 68 which, in turn, will reverse the rotational movement of the spindle 34.

As viewed in FIG. 1, the arcuate tool bit 30 preferably has a semi-circular shape and, therefore, the location of the actuator pins 94 and 95 should be adjusted to establish a semi-circular rotational movement of the spindle 34, by loosening the securing members 88 and 90 to adjust the positions of the actuator brackets 80 and 82 to establish the desired rotational range. Of course, it is apparent that the arcuate rotational range of movement of the spindle 34 can be adjusted to be less than 180°.

As shown in FIG. 2, as the tube 60 moves across a support 140 and enters into the interior of the spindle 34, the weld bead would be in the uppermost position of the tube 60 and would come in contact with the arcuate tool bit 30 as it oscillates to provide scarfing action to the tube 60 to remove the weld bead. Since the tool bit 30 oscillates back and forth, it provides not only a a scarfing action, but also applies a polishing action to the tube 60 passing through the spindle 34. In the event that during this operation the tool bit 30 is damaged or becomes worn out, an operator of the scarfing apparatus 26 can momentarily shut down the motor controller 120 and operate the quick-release handle 64 to move the bearing block 36 upwardly, thereby moving the tool bit 30 out of contact with the tube 60. Thereafter, bolts 76 are loosened to permit the brackets 74 to release the defective tool bit 30. A new tool bit is then inserted into the seat 72 and the bolts are tightened to lock the new tool bit in position. Thereafter, the motor controller 120 is placed in operation and the quick-release handle 64 is operated to lower the bearing block 36 to re-establish contact between the new tool bit 30 and the tube 60 to continue with the weld bead removal. The arcuate shape of the tool bit 30 provides an opening or space between the ends thereof through which the tube 60 may pass to engage the tooling surface of the tool bit 30, allowing replacement of the tool bit 30 without removing the tube 60 from the spindle 34.

During the short time required for the replacement of the defective tool bit, a portion of the tube 60 will pass through the spindle without having the weld bead removed from the tube. This short length of unscarfed tube can be processed by manual operation.

The motor controller 120 can be any one of such control apparatus commercially available, for example, a regenerated D.C. drive circuit, Model SECO "6504-NO" manufactured by Seco Electronics Corporation of Lancaster, S.C. The power unit 68 includes a D.C. motor having a rating of one-third H.P. and a speed reducer having a speed reduction of 1.2 rpm to 35 rpm, both of the foregoing being commercially available.

As described, the oscillatory rotational movement imparted to the spindle 34 is provided by a control means comprising a motor controller 120 and co-acting means having two co-acting sets such as pins 94 and 95, and respective sensors 102 and 104.

Although there has been illustrated and described a preferred embodiment of the invention, it will be understood that changes in the construction and operation disclosed may be made without departing from the spirit of the invention or the scope of the appended claims.

What is claimed is:

1. A scarfing apparatus for removing a weld bead from a tube being continuously formed by a tube forming machine, said apparatus including:

a hollow spindle;

support means for rotatably supporting said spindle;

power means for applying a rotary motion to said spindle;

a tool bit secured to said spindle for movement in an arcuate path responsive to rotation of said spindle and adapted to apply scarfing action to the weld bead as the tube moves through said hollow spindle;

control means coupled to said power means for imparting oscillatory rotational movement to said spindle;

said tool bit having a tooling surface portion having generally the shape of an arc of less than 360° of a circle;

the rotational range of said oscillatory rotational movement being less than 360° to maintain continuous contact of the tooling surface portion of the oscillating tool bit with the weld bead on the tube;

said control means comprising first and second actuator means supported on the spindle for movement in an arcuate path responsive to rotation thereof, first and second sensor means operatively associated with said support means and operatively associated with and operated by the first and second actuator means respectively, and reversing means for reversing the power means, said reversing means being operatively associated with the first and second sensor means to reverse the power means responsive to activation of one of said sensor means whereby at one extreme position of oscillation of the spindle one of the actuator means co-acts with one of the sensor means to reverse the direction of rotation of the spindle and at another position of oscillation of the spindle the other of the actuator means co-acts with the other of the sensor means to reverse the direction of rotation of the spindle.

2. The apparatus according to claim 1, wherein said sensor means and actuator means establish a range of movement not more than 90° in each oscillatory direction.

3. The apparatus according to claim 1, said control means including a motor controller coupled to said power means.

4. The apparatus according to claim 3, said reversing means including a latching relay coupled between said first and second sensor means and said motor controller, said latching relay having two contact positions, the latching relay in each of said contact positions transmitting current to the motor controller in reverse polarity relative to the transmission of current in the other contact position.

5. The invention according to claim 1 and said tool bit having first and second portions thereon and a generally arcuate tooling surface portion being between said portions and defining a concavity in the tool bit, the tooling surface portion having generally the shape of an arc of less than 360° of a circle and engaging the tube during oscillation of the spindle;

said first and second portions defining a space therebetween communicating with the concavity and the tooling surface portion; and said first and second portions being spaced apart widely enough to enable the tube to pass through the space therebetween and into the concavity to engage the tooling surface portion whereby the tool bit may be mounted on said removed from the spindle without removing the tube from the spindle by passing the first and second portions around the tube.

6. The invention according to claim 5 and said tool bit comprising a generally arcuate member releasably secured to the spindle for ready replacement of said tool bit.

7. The invention according to claim 1 and first and second sensor adjustment means supporting the first and second sensor means respectively for independent adjusting movement thereof for adjusting the range of oscillation of the spindle.

8. The invention according to claim 7 and first and second actuator adjustment means supporting the first and second actuator means respectively for independent adjusting movement thereof for adjusting the range of oscillation of the spindle.

9. The invention according to claim 1 and said spindle having two opposing end portions, said tool bit being mounted on one of said end portions, and said first and second actuator means being mounted on the other of said end portions.

10. In a scarfing apparatus for removing a weld bead from a continuously formed tube, said apparatus including a hollow spindle, means for rotatably supporting the spindle, and power means for applying a rotary motion to said spindle, the improvement comprising:

a tool bit supported on the spindle for rotational movement therewith;

holding means for releasably securing the tool bit on the spindle whereby the tool bit may be replaced when damaged, control means coupled to said power means for imparting oscillatory rotational movement with a rotational range of less than 360° to said spindle and said tool bit, whereby said tool bit scarfs the weld bead back and forth to remove the bead and polish the scarfed surface;

said tool bit having first and second portions thereon and a generally arcuate tooling surface portion being between said portions and defining a concavity in the tool bit, the tooling surface portion having generally the shape of an arc of less than 360° of a circle and engaging the tube during oscillation of the spindle;

said first and second portions defining a space therebetween communicating with the concavity and the tooling surface portion; and said first and second portions being spaced apart widely enough to enable the tube to pass through the space therebetween and into the concavity to engage the tooling surface portion whereby the tool bit may be mounted on and removed from the spindle without removing the tube from the spindle by passing the first and second portions around the tube.

11. The invention according to claim 10 and said tool bit comprising a generally semicircular member.

12. The invention according to claim 10 and
said holding means including screw means engaging said spindle for releasably securing the tool bit thereon.

13. The apparatus according to claim 10, said control means including means for reversing the polarity of electric current applied to said power means, and co-acting means having two co-acting sets, means for mounting one co-acting set on said spindle, and other means for mounting the other co-acting set adjacent said spindle whereby the relative movement between said two co-acting sets initiates a signal to said polarity reversing means to change the rotational direction of said spindle.

14. The apparatus according to claim 13, including adjusting means for adjustably securing at least one of said co-acting sets to establish the range of the rotational oscillatory motion.

15. The apparatus according to claim 14, wherein said co-acting means establishes a range of movement not more than 180°.

16. The apparatus according to claim 10, said control means including a motor controller coupled to said power means, and position sensing means coupled to said motor controller.

17. The apparatus according to claim 16, said position sensing means comprising a pair of co-acting sets of members, one co-acting set of members being position indicating members, and the other co-acting set of members being position sensing members, spindle mounting bracket means for mounting one of said co-acting sets on said spindle and stationary mounting bracket means for mounting said other co-acting set in a stationary position adjacent said spindle, whereby the movement of the co-acting set of members mounted on the spindle with respect to the other co-acting set of members will generate a signal to reverse the polarity of current applied to the power means.

18. The apparatus according to claim 17, including a latching relay coupled between said stationary mounted co-acting set of members and said motor controller, said relay having two positions, each position of the relay transmitting current to the motor controller in reverse polarity to that of the other position of the relay.

19. The apparatus according to claim 17, wherein said spindle mounting bracket means comprises a pair of arcuately-shaped brackets conforming arcuately to an end of said spindle, said position indicating member being in the form of a pin mounted on each of said brackets amid ends of said bracket and extending outwardly along the longitudinal axis of said spindle, each portion of the bracket between the pin and the end of the bracket defining an arcuate opening, and securing members passing through said arcuate openings for adjustably securing said brackets to the end of said spindle.

20. The apparatus according to claim 17, wherein said stationary mounting bracket means comprises a pair of brackets mounted on a housing of said apparatus adjacent to the end of said spindle, said brackets being positioned generally 90° with respect to each other, said position sensing members being in the form of proximity switches having ends disposed tangentially to the periphery of the rotating spindle.

21. In a scarfing tool for removing a weld bead from a tubular member, a combination of a tool bit holder and a tool bit, said holder comprising a plate member having distal and frontal sides and provided with an opening for the passage of said tubular member through said holder, the distal side being adapted for securement to an end of a hollow spindle, said frontal side having an undercut portion extending across the width of said holder, the remaining portion of said holder defining an overhang, an arcuate seat formed in the central portion of the overhang and extending beyond each side of said opening, said tool bit having an arcuate shape complementarily fitted into said seat, and bracket members, one on each side of said opening, secured to said overhang and abutting ends of said tool bit.

22. The tool according to claim 21, wherein each bracket member includes a lip for abutting the respective end of said tool bit.

23. The tool according to claim 21, said frontal side having a peripheral shoulder, and a tool holder locking nut having a threaded surface for engaging the end of said spindle, said nut having an interior shoulder for abutting said peripheral shoulder and securing said holder to said spindle.

* * * * *